United States Patent [19]

Strickling, III et al.

[11] Patent Number: 5,440,324
[45] Date of Patent: Aug. 8, 1995

[54] BACKLIGHTING FOR LIQUID CRYSTAL DISPLAY

[75] Inventors: James E. Strickling, III, Duluth; Joseph W. Goode, III, Lawrenceville; William R. Dunn, Alpharetta, all of Ga.

[73] Assignee: Avionic Displays Corporation, Atlanta, Ga.

[21] Appl. No.: 998,526

[22] Filed: Dec. 30, 1992

[51] Int. Cl.⁶ .................................. G02F 1/33
[52] U.S. Cl. ........................ 345/102; 359/50
[58] Field of Search ............... 340/784, 811, 813, 814; 359/48, 49, 50; 315/158, 169.4, 306, 209 R, 219, 94, 101, 107; 362/80, 260, 29; 345/87, 50, 75, 73, 102; 313/315

[56] References Cited

U.S. PATENT DOCUMENTS

| | | | |
|---|---|---|---|
| 4,453,200 | 6/1984 | Trcka et al. | 362/31 |
| 4,649,322 | 3/1987 | Tellan et al. | 315/306 |
| 4,649,381 | 3/1987 | Masuda et al. | 345/102 |
| 4,748,546 | 5/1988 | Ukrainsky | 345/102 |
| 4,826,294 | 5/1989 | Imoto | 359/49 |
| 4,835,447 | 5/1989 | Mizuno et al. | 315/169.4 |
| 4,945,350 | 7/1990 | Kawamura | 345/102 |
| 4,958,915 | 9/1990 | Okada et al. | 340/784 |
| 4,974,122 | 11/1990 | Shaw | 362/31 |
| 4,998,045 | 3/1991 | Ruby | 315/209 R |
| 5,019,808 | 5/1991 | Prince et al. | 340/765 |
| 5,030,887 | 7/1991 | Guisinger | 315/158 |
| 5,030,943 | 7/1991 | Anglin | 345/102 |
| 5,041,823 | 8/1991 | Johnson et al. | 340/784 |
| 5,078,476 | 1/1992 | Shin | 340/814 |
| 5,128,783 | 7/1992 | Abileah et al. | 359/49 |
| 5,130,907 | 7/1992 | Tortola et al. | 345/102 |
| 5,142,433 | 9/1992 | Farrell | 362/29 |
| 5,143,433 | 9/1992 | Farrell | 359/49 |
| 5,147,127 | 9/1992 | Honda et al. | 359/50 |
| 5,195,822 | 3/1993 | Takahashi et al. | 359/50 |
| 5,214,522 | 5/1993 | Tagawa | 359/49 |

Primary Examiner—Alvin E. Oberley
Assistant Examiner—Steve Saras
Attorney, Agent, or Firm—Standley & Gilcrest

[57] ABSTRACT

Described is a backlighting module that may be used in an electronic liquid crystal display device. The backlighting includes one or more lamps within a cavity of the module. The lamps are capable of a wide range of luminance including low-level luminance achieved by a unique burst modulation scheme for driving the lamps.

9 Claims, 5 Drawing Sheets

BACKLIGHTING FOR LIQUID CRYSTAL DISPLAY

BACKGROUND AND SUMMARY OF THE INVENTION

The present invention relates generally to electronic display indicators, and more particularly, to an electronic liquid crystal display indicator having a backlighting module therein.

Electronic liquid crystal displays may be used in a variety of applications including, for example, use in aircraft instrument panels as flight indicators, in military tank instrument panels, and in submarine guidance instruments, just to name a few of the many applications for such devices. Previously known display indicators have suffered from various drawbacks. For example, flight indicators have not been very reliable. Periodic failures result in an aircraft being taken out of service until the instrument can be replaced.

Another drawback that display indicators have suffered from is maintaining display visibility in all lighting environments. In military applications the advancement of night vision capability has placed a requirement on electronic guidance indicators to be visible at low levels of backlighting luminance during nighttime operation and night vision equipment usage. Low level luminance prevents the excitation of night vision equipment. Previously known indicators have not had the desired low level, yet visible luminance, required for night vision capability. Another lighting problem of an opposite nature has been bright sunshine penetrating aircraft cockpits making it very difficult to see the display. This occurrence requires high luminance capability from the backlighting source to make the display clearly visible to the pilot. Known backlighting luminance has not achieved desired results.

Maintenance on known guidance system indicators has also been problematic. Ordinarily if one part was in need of repair several other components of the unit would have to be removed in order to replace the broken component. For example, to replace a broken lamp one or more manhours has typically been needed. A need exists to overcome the aforementioned disadvantages.

The present invention comprises an electronic liquid crystal display indicator having a modular lamp design which may be easily removed and replaced. The lamp module provides the capability for high luminance levels never before achieved on such indicators while further providing low level, flicker free luminance for night vision applications. The liquid crystal display (LCD) technology of the present invention is capable of producing a guidance system display on a viewing screen of the indicator unit. The technology may be further enhanced to include an active matrix liquid crystal display (AMLCD) consisting of a series of rows and columns of red, green, and blue dot transistors sandwiched between two glass panels. There may be a plurality of columns of dots going across the display as well as a plurality of vertical rows of dots resulting in a multitude of individual transistor switch dot triplets of red, green and blue. The liquid crystal display is driven by electronics that may be contained within a body or chassis portion of the indicator assembly.

The guidance indicator assembly of the present invention may include a body or chassis, a mounting flange assembly, a lamp module, and a bezel for the face of the indicator. In the present invention, the backlighting may be removed from the chassis to immediately adjacent the front mounting flange in a lamp module housing. This provides more physical space to place a light source and to allow for an increased viewing area for the indicator. Furthermore, locating the backlighting immediately adjacent the display screen reduces stray light losses, while focusing the backlighting directly onto the display area.

In a preferred embodiment of the present invention, one or more hot cathode fluorescent lamps are secured within and form a part of a lamp module. The lamp module is preferably a one-piece self-contained aluminum housing. A wide range of luminance may be provided with the present invention. High levels of luminance are obtained with the use of particular lamps and a unique lamp configuration along with the location of the lamps very near the display screen. Low level luminance is obtained without flickering by driving the fluorescent lamp(s) with an AC wave form using a burst modulation scheme. Burst modulation may be accomplished by providing a voltage to the lamps with the filaments off then providing a voltage to the filaments when the lamps are off. This process eliminates flickering which is caused by cross-modulation.

The present invention will be better understood from the following description of the drawings and detailed description of preferred embodiment(s).

DETAILED DESCRIPTION OF PREFERRED EMBODIMENT(S)

Figure 1:
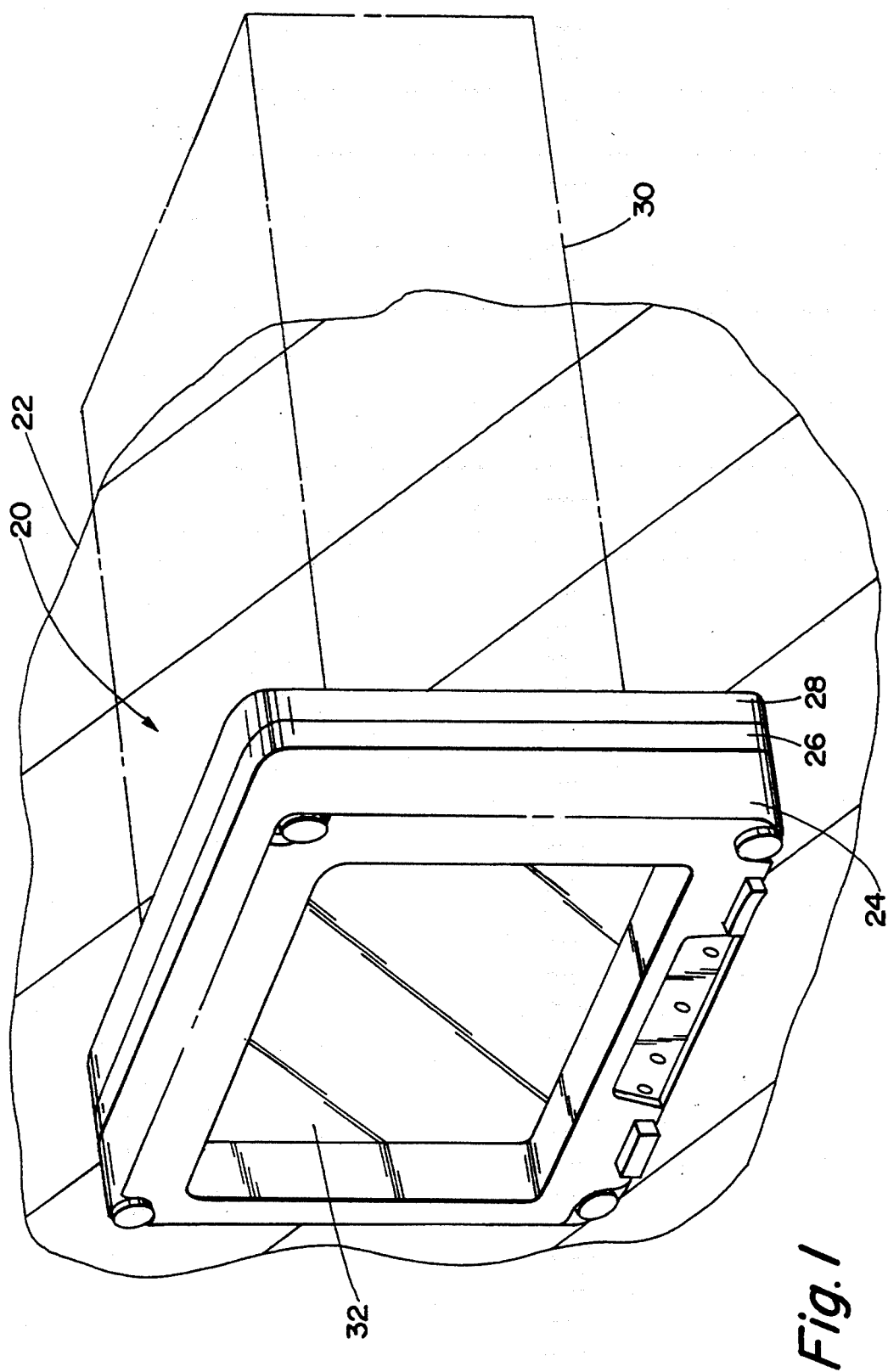
FIG. 1 is a perspective view of one embodiment of an electronic display indicator of the present invention.
Figure 2:
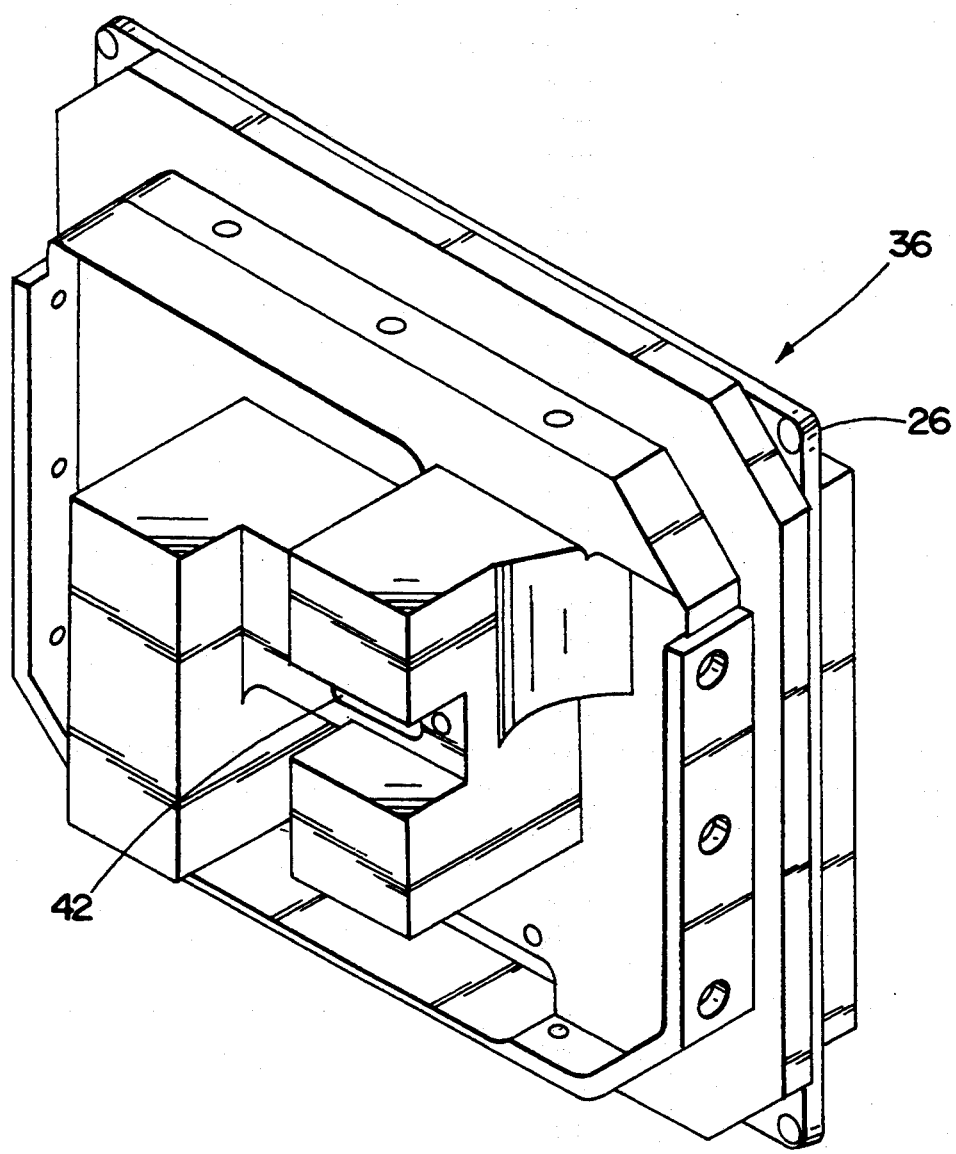
FIG. 2 is a perspective view of the chassis side of one embodiment of the lamp module of the present invention.
Figure 3:
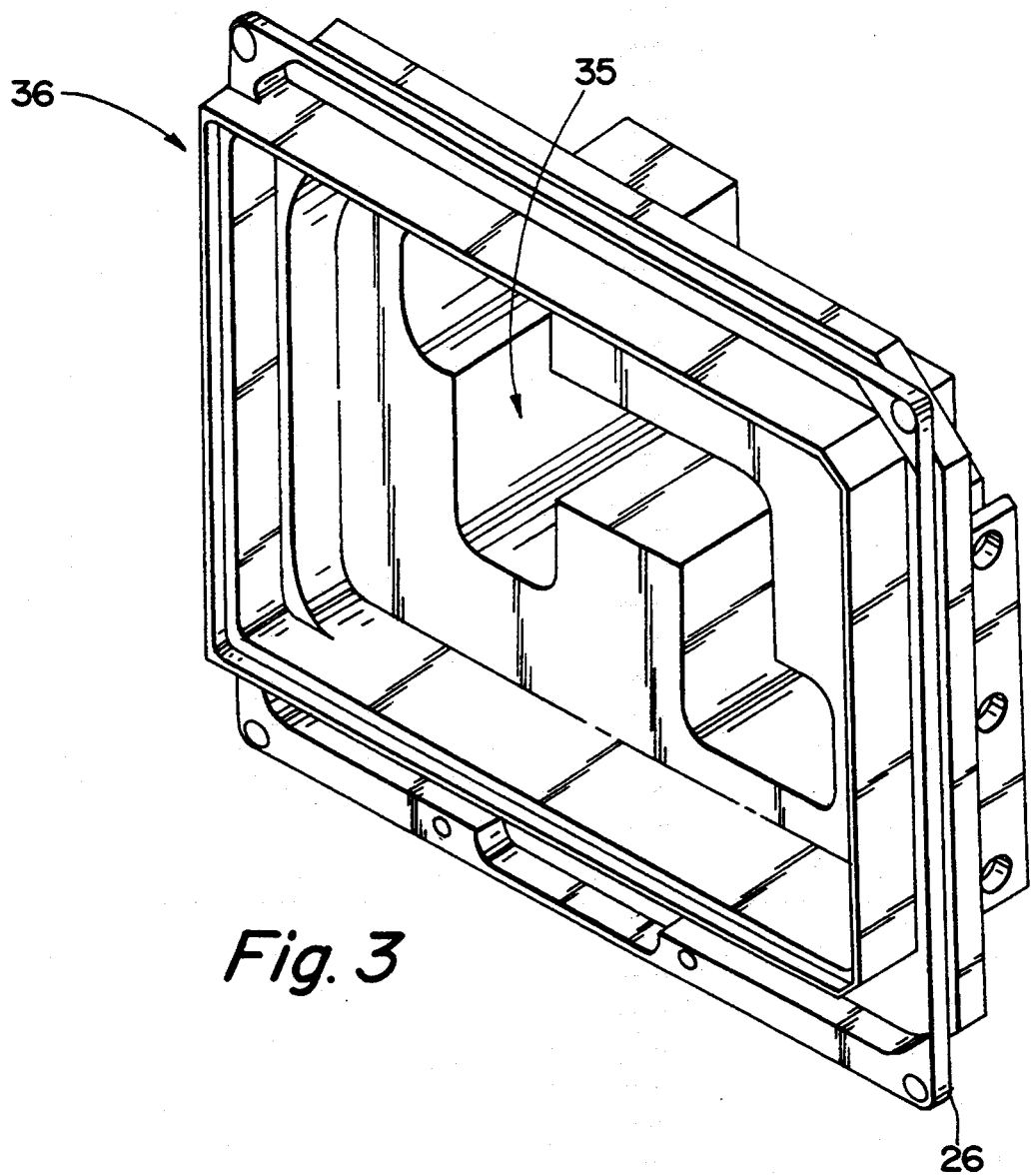
FIG. 3 is a perspective view of the lamp module of FIG. 2.
Figure 4:
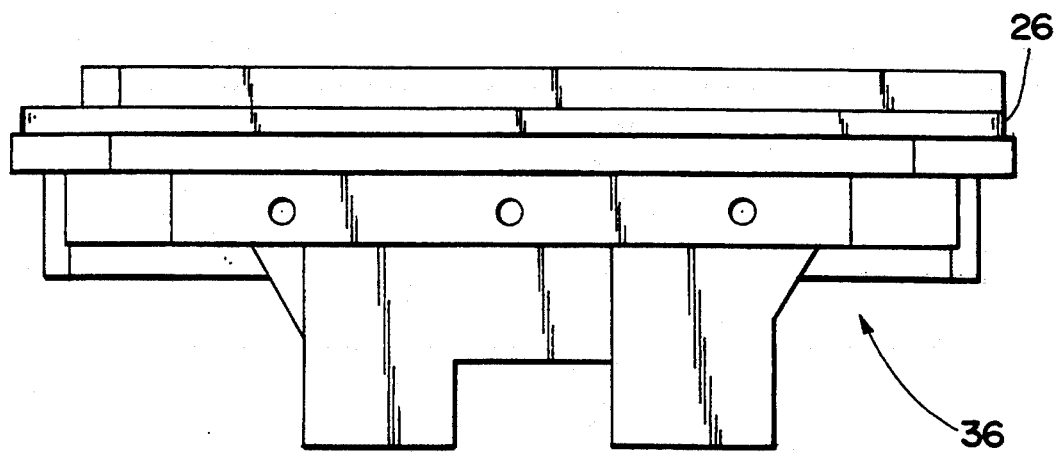
FIG. 4 is a view looking down onto the top side of the lamp module shown in FIG. 2.
Figure 5:
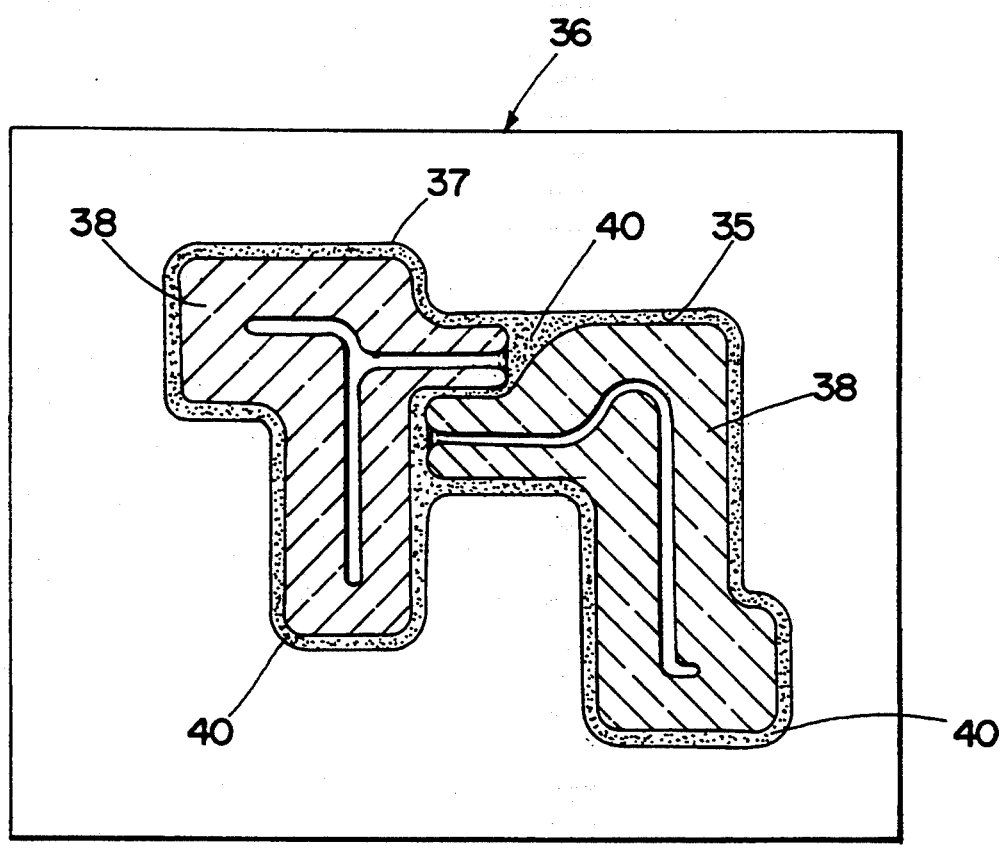
FIG. 5 is a plan view of one embodiment of a lamp comfiguration within the module shown in FIG. 2.

Referring now to the drawings, and particularly FIG. 1, there is shown an electronic display indicator 20 as it resides in an instrument panel 22. The indicator 20 may include a bezel 24, a mounting flange 26 which forms a part of a lamp module 27, an adapter plate 28, and a chassis 30. The chassis 30 houses the electronic components and circuitry that receive signals from one or more devices connected to the display indicator, process those signals, and produce a display on the viewing screen 32 visible through the opening in the bezel 24. The bezel 24 resides on the side of the instrument panel 22 closest to an operator. The chassis 30 resides substantially on the side of the instrument panel opposite the operator.

Referring to FIGS. 2-5, a preferred embodiment of the backlighting module 27 of the present invention is shown. The module may comprise a one-piece, self-contained aluminum housing 36. One method of making the aluminum housing is to start with a solid aluminum block which is machined out to provide cavities 37 for holding a lamp(s). It should be recognized that the cavities 37 may be of various shapes to suit any particular application of the present invention. In one example of the present invention, the cavity 37 contains two 15 watt hot cathode fluorescent lamps 38. The lamps 38 may be configured in a serpentine compact relationship adjacent each other to provide maximum lamp surface area for high luminance. The lamps 38 may be secured within the cavities 37 by embedding the lamps within a silicon rubber compound 40 that surrounds the lamps and fills the voids in the cavities that are not filled by the lamps themselves. The rubber compound provides mechanical support for the lamps and may also assist in cooling the lamp module by being thermally conductive. One such silicon rubber compound is offered by Castall, Inc. in East Weymouth, Mass. The silicon rubber potting compound may also assist as an optical reflector by using a white (or near white) compound material.

The lamp module of the present invention is designed to be entirely removed and replaced with another lamp module of the same design if lamp failure occurs. Because the lamp module may be designed to be installed with as few as four threaded fasteners at each corner of a mounting flange 26 of the lamp module 27, replacement is readily accomplished. Technicians replacing the lamp module are not required to attempt to replace the lamps themselves but instead replace the modules in their entirety. By avoiding the need to work with small fragile components, and providing one self-contained backlighting module which can be replaced as an entire unit, the technician's job is dramatically quickened.

Each of the lamps are equipped with connectors for connection to an electrical power supply source preferably located in the chassis. Preferably, within the lamp cavity 37 of the module an orifice 42 is provided for facilitating engagement of the lamp connectors to the power supply. The receptacle may be wired to form a connection outside of the lamp module with a power source in the chassis.

Fluorescent lamps have filaments in addition to the lamp. The lamp can be on while the filaments are off. The filaments can be on while the lamp is off. When fluorescent lamps are used as a part of the present invention they are preferably driven with an AC wave form. A wave form is applied to each filament. A cross-modulation of the lamp voltage can occur. This can cause flickering due to asynchronous operation of the lamp and filaments.

Figure 6:
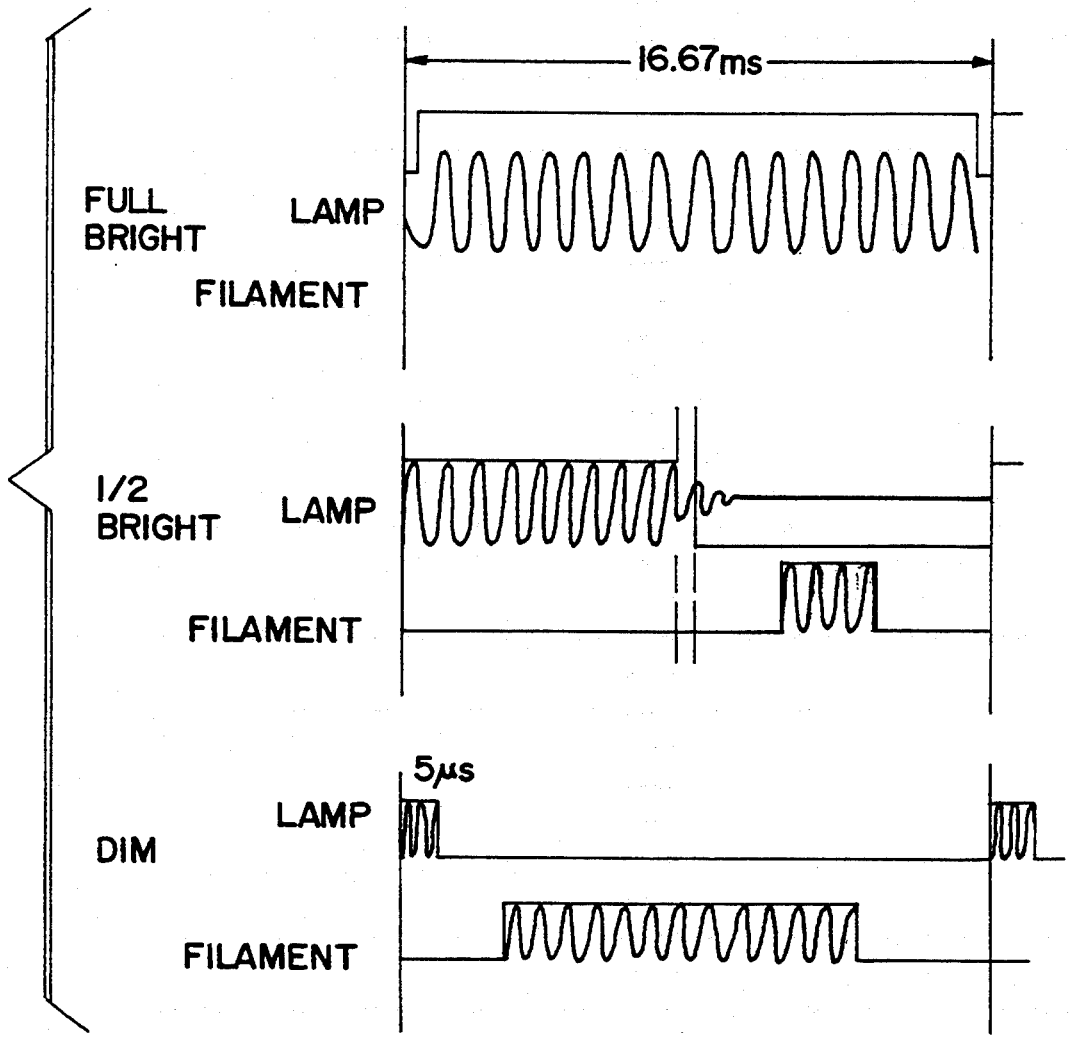
FIG. 6 is a diagramatical view of a burst modulation scheme of the present invention.

Referring to FIG. 6, in the present invention the two wave forms may be synchronized by a burst modulation scheme. This is accomplished by turning the lamp on then turning the lamp off and letting the oscillation of the wave form die out. While the lamp is off and when the oscillation has died out the filaments are turned on. Then the filaments are turned off and the filament wave form is allowed to die down. Once this has occurred the lamp is turned on again. This eliminates cross-modulation and thus eliminates flickering. The lamp refresh period may be set at 60 Hz. In a preferred embodiment, the lamp is left on for about 50 microseconds for low luminance applications and for about 17 milliseconds for high luminance applications. A microprocessor contained within the chassis of the electronic display indicator may be programed to automatically coordinate the burst modulation scheme of the present invention.

Another advantage of the lamp module of the present invention is that it seals in infrared radiation. By having solid aluminum on five sides of the lamps, infrared radiation is contained. This is crucial for night vision usage of the electronic display indicator. Night vision goggles worn by vehicle operators are activated by infrared radiation. By maintaining very low infrared radiation levels the goggles will not be excited (stimulated) which causes vision disturbances to the wearer. The requirements for military night vision goggles compatibility are found in United States Military Spec Mil-L-85762A.

It is thought that the advantages of the present invention will be apparent from the description of the drawings and preferred embodiments contained herein. It will be appreciated that after reading this specification those of skill in the art will arrive at various modifications to the invention described herein and these modifications are anticipated to fall within the scope of the present invention and the claims contained herein.

What is claimed is:

1. An apparatus, comprising:
   a chassis;
   a liquid crystal display screen in association with and external to said chassis;
   a backlighting module immediately adjacent said liquid crystal display and in a secured relationship with said chassis, said module including a housing and said housing having a cavity formed integral therewith; and
   at least one hot cathode fluorescent lamp secured within said cavity formed in said module, such that said lamp provides backlighting to said liquid crystal display while said lamp is concealed within said housing of said module from all other directions, wherein said lamp is driven by a synchronized burst modulation wave form.

2. The apparatus of claim 1, wherein said lamp module is comprised of a one-piece housing made of aluminum.

3. The apparatus 0f claim 1, wherein said lamp is secured within said module by a potting compound, which fills the remaining voids in said cavity.

4. The apparatus of claim 1, wherein said lamp is configured in a compact serpentine arrangement to provide increased lamp surface area in the limited space environment of said module.

5. The apparatus of claim 1, wherein said synchronized burst modulation wave form drives the lamp on while the filament is off and then turns the lamp off and drives the filament.

6. A method for providing low level, flicker free luminance for a backlighting lamp, said method comprising the steps of:
   selecting a fluorescent lamp;
   securing said lamp within a structure adjacent a liquid crystal display to provide backlighting for said liquid crystal display; driving said lamp and a filament within said lamp with a synchronized burst modulation wave form.

7. The method of claim 6, wherein said wave form is AC and is alternated from said lamp to said filament.

8. The method of claim 6, wherein said burst modulation includes the steps of:
   turning said lamp on for a brief time; turning said lamp off and immediately turning said filaments on; turning said filaments off and immediately turning said lamp on again; and repeating said on/off steps rapidly to accomplish flicker free operation of said backlighting.

9. An apparatus, comprising:
   a chassis;

a liquid crystal display screen in association with and external to said chassis;

a backlighting module immediately adjacent said liquid crystal display and in a secured relationship with said chassis, said module including a housing and said housing having a cavity formed integral therewith, wherein said module is comprised of a one-piece housing made of aluminum; and at least one hot cathode fluorescent lamp secured within said cavity with a potting compound that fills the remaining voids in said cavity, such that said lamp provides backlighting to said liquid crystal display while said lamp is concealed within said housing of said module from all other directions, wherein said lamp is driven by a synchronized burst modulation wave form that drives the lamp on while the filament is off and then turns the lamp off and drives the filament, wherein said lamp is configured in a compact serpentine arrangement to provide increased lamp surface area in the limited space environment of said module.

* * * * *